April 18, 1950 D. P. LONG 2,504,708

SELECTING SWITCH FOR USE IN TELEPHONE SYSTEMS

Filed April 25, 1946 2 Sheets-Sheet 1

Inventor
DOUGLAS PERCY LONG
By Chas. W. Candy
Attorney

April 18, 1950 D. P. LONG 2,504,708

SELECTING SWITCH FOR USE IN TELEPHONE SYSTEMS

Filed April 25, 1946 2 Sheets-Sheet 2

Inventor
DOUGLAS PERCY LONG

By [signature]
Attorney

Patented Apr. 18, 1950 2,504,708

UNITED STATES PATENT OFFICE 2,504,708

SELECTING SWITCH FOR USE IN TELEPHONE SYSTEMS

Douglas Percy Long, Chislehurst, England, assignor to Siemens Brothers & Company Limited, London, England, a British company Application April 25, 1946, Serial No. 664,960
In Great Britain May 4, 1945

7 Claims. (Cl. 179—18)

Figure 1:
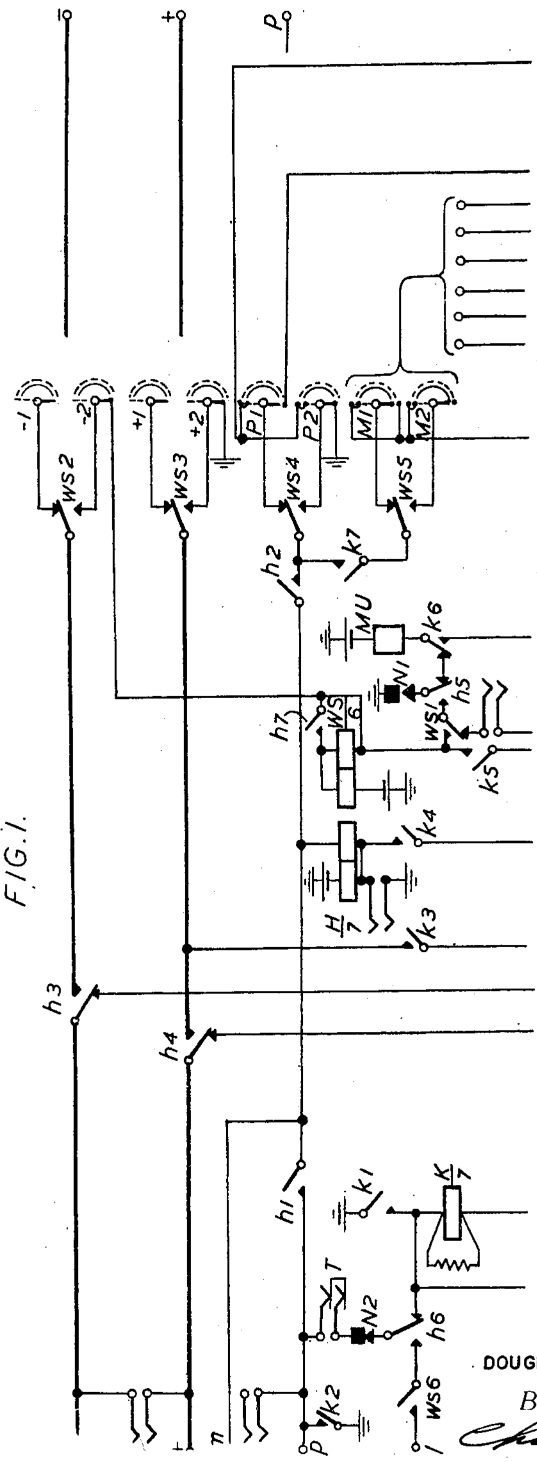

This invention relates to automatic telephone systems and more particularly to systems in which apparatus that is used temporarily in the operation of a selecting switch is included in a circuit available in common to a number of selecting switches which circuit is taken into use and associated with a particular selecting switch as required and is released after the conversational path has been set up. In such a system it is desirable that, in the event of a selecting switch being taken into use and no impulses being received at it, the common apparatus should be released and only the selecting switch held. The present invention has in view improved means to this end.

In the present invention if impulses are not received at a single motion selecting switch and its associated common control circuit within a given time, the common control circuit is released by forced operation of the switching relay and a further relay in the individual selector provided for other purposes is connected to the loop over which it is held so long as the loop remains unbroken, and maintains the circuit for the switching relay and the engaged marking on the incoming test wire. The holding circuit for the further relay conveniently includes normal contacts in the selector bank and the engaging potential may likewise be applied over a normal contact in the test wire bank. In a 200 outlet selector in which one or other of two sets of wipers is connected up by a relay termed herein a wiper switching relay, the normal operation of which is determined by the digit or one of a pair of digits received at the selector, this relay may be arranged to be operated on expiry of the given time if no impulses have been received and to connect itself by means of its wiper switching contacts to one of the speaking wires and to prepare a return path over the other speaking wire. The switching relay would also be operated at the end of the given time and, in known manner, extend the test wire through to the test wiper connected up by the wiper switching relay. For the operation of these two relays the test relay or its auxiliary in the common control circuit may be operated directly or indirectly by the pulse given after the expiry of the given time to close circuits for them, the circuit for the wiper switching relay including contacts which are opened when impulses are received and remain open until switching has been completed. The wiper switching relay may be provided with means for delaying its release, e. g. a second low resistance winding adapted to be short-circuited by a make contact of the switching relay and an alarm circuit may be connected to the incoming test wire over make contacts of the switching and wiper switching relays and a contact opened as a result of the receipt of impulses, e. g. an off-normal contact of the selecting switch. The coupling relay for coupling the individual selector to the common control circuit may be released in the normal manner following the operation of the switching relay.

Reference will now be had to the accompanying drawings which show by way of example an embodiment of the invention.

Figure 2:
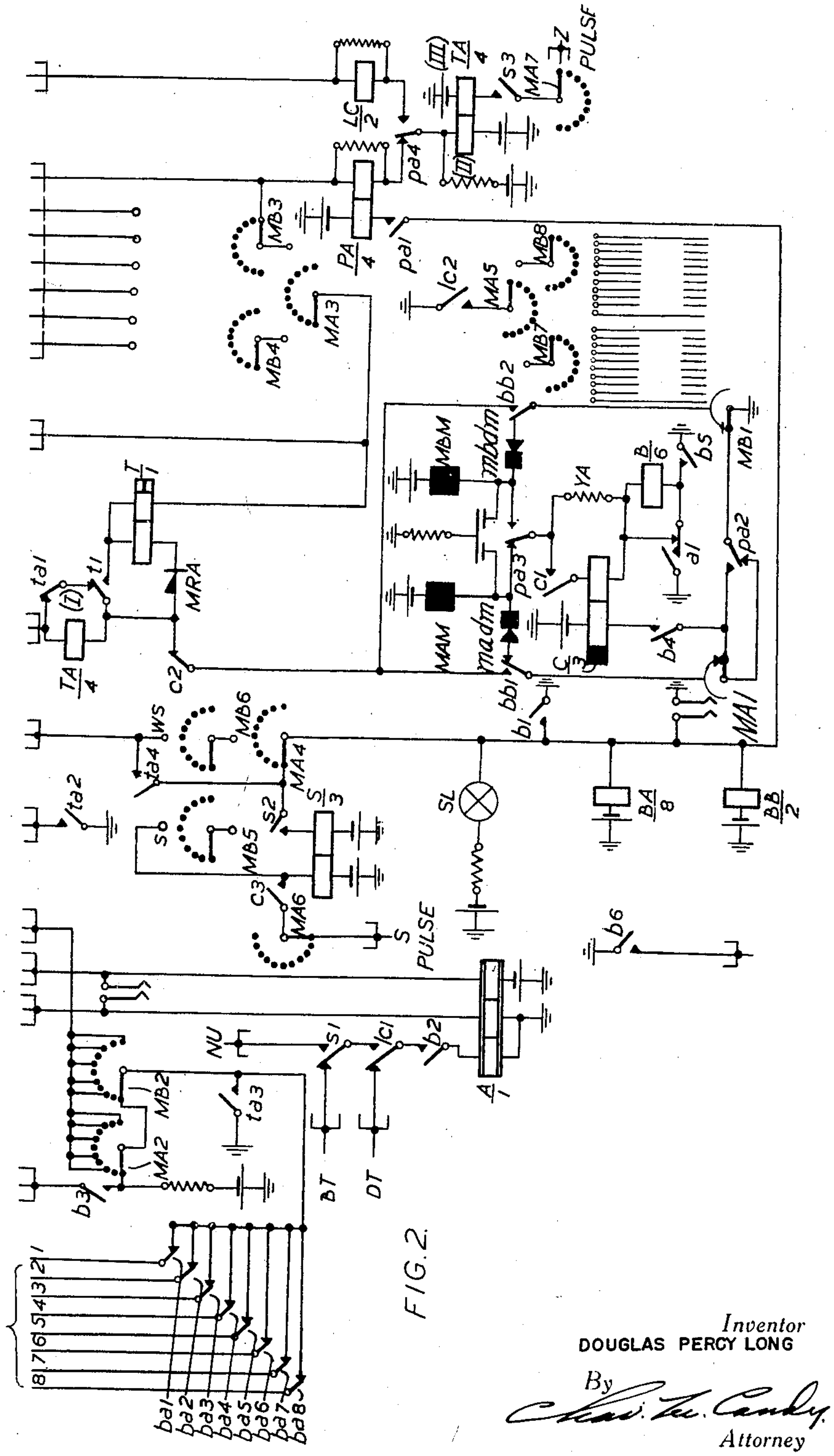

The drawings show, in Fig. 1, the circuit of a first selector in which the incoming wires are switched directly through to the selector wipers and in Fig. 2 a common control circuit for the control of a group of first selectors of which the selector shown in Fig. 1 is one. The first selector illustrated in the drawing is a single motion switch having 200 outlets, access to one hundred outlets being had over back contacts of a wiper switching relay and access to the other hundred outlets being had over front contacts of the wiper switching relay. The contact bank of the selector comprises 16 arcs of 52 contacts each, the arcs being paired, the two arcs of a pair being traversed respectively by the two ends of a wiper in succession, one end of the wiper entering one arc after the other end of the wiper leaves its associated arc. The arcs over which the wipers first sweep are indicated in full lines and are swept by the ends of the wipers shown in full lines and the arcs over which wipers sweep after traversing the full lines arcs are indicated in broken lines and are swept by the ends of the wipers shown in broken lines. The wipers are denoted by the characters —, +, P and M for the negative and positive line wire wipers, the test and holding wire wipers and the marking wipers, a numeral indicating the wipers associated with arcs of contacts of a particular group of one hundred outlets. The selector is driven by an individual electric motor under the control of a magnet, the driving mechanism being represented generally by the magnet MU. There are two off-normal contacts N1 and N2 operated when the wipers leave the position at the commencement of the bank on which they normally rest. The normal contacts are not connected to outlets but are used for giving an indication that the switch is improperly held, such as by a fault on the line or by a subscriber's removing his receiver and failing to dial. The next 50 contacts are connected to outlets and the 52nd contact is not used. In the broken line arcs the first contact in the arc of wiper P1 is concerned with stopping the switch at the end of its preliminary movement and the last or 52nd contacts in the test arcs are connected to a circuit for stopping the switch if no free outlet in a desired group has been found and for giving a busy signal. The intermediate 50 contacts are connected to outlets. The 100 contacts in the banks of wipers M corresponding to outlet positions are connected to banks of marking switches in the common control circuit. The selector circuit includes a coupling relay K for coupling the selector to the common control circuit serving it, the switching relay H and the wiper switching relay WS, and an alarm lamp and relay are adapted to be connected to the front contact *ws6* of relay WS. The wiper switching relay WS besides its connection to an operating circuit for wiper switching purposes is connected to the normal contact in the arc of wiper −2, the earth for the relay being connected to the normal contact in the arc of wiper +2.

The common control circuit includes the impulse receiving relay A, release relay B and its auxiliary relays BA and BB, slow releasing dialling relay C, high speed test relay T and auxiliary relay TA, time pulse relay S, steering relay PA and last contact relay LC. Relay TA has three windings, two of which designated I and II are wound so as to be differential when energised at the same time. The circuit also includes two marking switches MA and MB, switch MA being operated by a first or only digit and switch MB by a second digit. The marking switches are illustrated as being of the pawl and ratchet stepping type, the driving magnets being designated MAM and MBM, respectively. The switch MA has 7 wipers designated MA1-MA7 and the switch MB has 8 wipers designated MB1-MB8. Wipers MA1 and MB1 are homing wipers and they are also included in the test circuit for testing outlets of a group selected by one or two digits respectively. Wipers MA2 and MB2 are concerned with passing forward a discriminating signal to cause a pre-selection of one of two main groups of outlets from the succeeding selector, wipers MA3, MB3, anud MB4 are marking wipers and wipers MA5, MB7 and MB8 are wipers connected similarly to the marking wipers for the operation of overflow meters, wipers MA4, MB5 and MB6 are concerned with the operation of wiper switching relay WS for the selection of one or other main group of one hundred outlets, wiper MA6 is included in the circuit of time pulse relay S, and wiper MA7 is included in a circuit for relay TA by a Z time pulse. The banks of contacts associated with the marking wipers MA3, MB3, and MB4 are connected as required to the marking arcs on the selectors, outlet groups selectable by one digit being connected in the full line arcs of the selecting switch, the corresponding contacts in the M arcs being connected to contacts in the bank of wiper MA3. Outlets of groups selectable by two digits may be connected in either arc of a pair in the selecting switch the corresponding contacts in the M arcs being connected to contacts in the banks of wiper MB3 or MB4. The marking switches have magnet-operated contacts *madm* and *mbdm* respectively.

The general arrangements of the circuits having been dealt with, the detailed operations involved in the selection of a free outlet in a desired group will now be described.

The selector and common control circuit test free by reason of the battery connection to wire *p* over contacts N2, *h6*, *ba1* and wipers MB2 and MA2 in their normal positions. Contacts *ba2*–*ba8* are included in the test-in circuit for 7 other selectors served by the same common control circuit. When the selector is taken into use, relay A is operated over contacts *h3* and *h4* and a preceding loop and at contact *a1* closes a circuit for relay B over resistance YA, contact *pa3* and magnet MAM. Relay B operates and at contact *b1* closes circuits for relays BA and BB and lights the supervisory lamp SL. Contact *b2* connects dialling tone over wire DT and contact *lc1* to the left-hand winding of relay A whence it is induced into the line, contact *b3* connects battery to relay K which operates to earth applied to the test wire *p* in the circuit which caused the selector illustrated to be taken into use, contact *b4* closes a circuit from earth over wiper MB1 in its normal position, contact *pa2* and wiper MA1 in its normal position for the left-hand winding of relay C, contact *b5* prepares a holding circuit for relay C during impulsing and contact *b6* closes a circuit for starting the tone generator. Relay BB at contacts *bb1* and *bb2* opens the homing circuits for the marking switches and closes points in the test circuit and the circuit of magnet MU of the selector. Relay BA on operation opens at its 8 contacts the test-in circuits for the several selectors served by the common control circuit illustrated to prevent their being taken into use while the common control circuit is in use. Relay C operates and at contact *c1* prepares an operating circuit for magnet MAM and a temporary holding circuit for itself, at contact *c2* opens a point in the circuit for magnet MU to guard against its operation during impulse reception and at contact *c3* connects the S pulse wire over wiper MA6 in its normal position to relay S. Relay K operates and locks up at contact *k1*, applies a guarding earth to the test wire *p* at contact *k2*, connects the positive wire to contacts in the banks of wipers MA2 and MB2 at contact *k3*, closes points in circuits for relay WS and magnet MU at contacts *k5* and *k6* respectively, and connects up the test circuit at contact *k7*.

Impulses should now be received and relay A will respond to the impulses and at contact *a1* repeat them in a circuit from earth over contacts *b5*, *a1*, low resistance right-hand winding of relay C, contacts *c1*, *pa3*, magnet MAM to battery. Magnet MAM operates and steps the marking switch MA in accordance with the number of impulses received. As soon as switch MA takes its first step, the operating circuit for relay C is opened at wiper MA1 and that relay depends for its continued operation on the repeated impulses to magnet MAM and its copper slug. At the end of the impulse train, relay A remains steadily operated and the circuit for relay C is opened, the resistance of relay B being too high to permit holding of relay C in series with it so that after a period relay C releases. A test is made to determine if a preliminary movement of the selector wipers is required. If the digit received indicates that the selector is to be set in accordance with that digit alone, the relevant contact in the bank of wiper MA3 will be connected over one of the group of marking wires to contacts in one or other of the full line arcs M. If the digit received indicates that selection is to be made in accordance with this digit and a second digit, the relevant contact in the bank of wiper MA3 will be connected to either wiper MB3 or MB4 depending on which arc in the selector the group indicated by the first received digit is connected. Furthermore, if the desired group of outlets is connected in the arcs of even-numbered wipers of the selector, the relevant contact in the bank of wiper MA4, MB5 or MB6 will be connected to terminal *ws* for the operation of the wiper switching relay WS.

On the release of relay C, contact *c2* closes a circuit over wiper MB1 at normal, contact *pa2*, wiper MA1 off normal, contacts *bb1*, *t1*, *ta1* and *k6* for magnet MU and also connects relay T in a preliminary testing circuit over wiper MA3. If the setting of switch MA indicates that a second digit is to be received and that selection is to take place in the full line arcs of the selector, relay T will operate immediately from earth over the circuit previously described for magnet MU up to contact *c2*, thence over rectifier MRA, both windings of relay T in series, wiper MA3, wiper MB3 at normal, the shunt across the right hand winding of relay PA, contact *pa4* and the shunt across winding II of relay TA. Contact *t1* changes over preventing operation of magnet MU and shunting the high resistance left hand winding of relay T. Relay PA operates very shortly after relay T by means of its right-hand winding and locks up over its left-hand winding, early make contact *pa1* and contact *b1*. Relay TA does not operate because its windings I and II, both of which are now energised are differentially connected. Winding I of relay TA is energised in series with magnet MU after the removal of the short-circuit across the relay winding at contact *t1*, but magnet MU will not operate nor hold in series with the winding of relay TA. Contact *pa2* closes a circuit for re-operating relay C independently of wiper MA1, contact *pa3* substitutes magnet MBM for magnet MAM in the impulse repeating circuit and contact *pa4* releases relay T and connects up relay LC for operation under overflow conditions. Both windings of relay TA become deenergised by the release of relay T.

If the first digit indicated that a group in a broken line arc of the selector is to be searched, the group being completely determined by a second digit, the relevant contact in the bank of wiper MA3 would be connected to wiper MB4 and on the release of relay C at the end of the first digit, the earth over relay T would be extended as before. However, as wiper MB3 will not now be connected and as wiper M1 is not resting on the first contact in the broken line arc but on the normal contact at the commencement of the full line arc, relay T will not be operated, but magnet MU will operate and the selector wipers will be driven round until the broken line wipers engage the first contacts in their arcs. When the wipers reach the last contacts in the full line arcs, they will not be stopped as they would have been had they been searching these arcs as the circuit over these contacts will be open at this time at contact *pa4*; consequently the wipers will be driven past these contacts to the first contacts in the broken line arcs. In this latter position a circuit will be found for relay T over the contact in the arc of wiper M1, the wiper, contacts *ws5*, *k7*, *ws4*, wiper P1, shunt across the right-hand winding of relay PA, contact *pa4* and the shunt across winding II of relay TA. Relays T and PA will operate with the before-mentioned results but relay TA will not be operated.

If the digit received denoted a group determined solely by that digit, the selector would have been started in search of a free outlet in the group which would be marked in the full line arcs of wiper M1 or M2 over one of the marking wires connected to the contact in the banks of wiper MA3 on which that wiper is resting.

A second digit is repeated to magnet MBM in exactly the same way as the first digit is repeated to magnet MAM and the relevant group is marked in the bank of wiper MB3 or MB4 as the case may be. Relay WS will be operated over wiper MA4, or MA4 and MB5 or MB6 if the digit or digits denote a group requiring wiper switching, contacts *ws2*—*ws5* changing over the connections from the odd-numbered wipers of the selector to the even-numbered wipers.

As soon as the digit determining the wanted group has been received and relay C released, magnet MU is operated and the selector wipers are driven in search of a free outlet in the wanted group. The earth for the test relay is applied over one of the relevant marking switch wipers and marking wires to all the contacts of the group in the marking bank M1 or M2 as the case may be and the battery denoting a free outlet will be applied to the test wire outgoing from the relevant contact in one of the test arcs P. When a free outlet is found, relay T is operated in the circuit over the marking wipers of the marking switch, the relevant marking wire, marking wiper and test wiper of the selector to battery and at contact *t1* stops the selector by switching winding I of relay TA into the circuit of magnet MU. Earth over the low resistance right-hand winding of relay T is extended to the test wire to mark the outlet engaged. Relay TA operates by means of its winding I and opens a further point in the circuit for magnet MU at contact *ta1*. Contact *ta2* operates switching relay H, and relay T which, on the operation of relay H becomes short circuited, is released. Contact *ta3* applies earth to wiper MB2 and contact *ta4* plays no part in the present circumstances. Relay H operates and locks to wire *p* over its two windings in series, the right-hand winding being of high resistance, and contact *h1*, switches this wire and the two line wires through at contacts *h2*, *h3* and *h4* and closes a locking circuit for relay WS, if this has been operated, at contact *h5*. Consequent on the change-over of contacts *h3* and *h4* relay A is released and in turn this releases relays B, BA, BB and TA and, if operated, PA and the supervisory lamp SL is extinguished. The opening of contact *b3* releases relay K and the control circuit becomes disconnected from the selector. Release of relay BA re-connects the test-in circuit for all the selectors that are not already in use associated with the common control circuit. The release of relay BB closes the homing circuits for the marking switches, first over wiper MB1 off normal, contacts *bb2*, *mbdm*, and magnet MBM and when switch MB reaches normal the homing circuit for switch MA is closed over wiper MB1 at normal, contact *pa2*, wiper MA1 off normal, contacts *bb1*, *madm* and magnet MAM, the circuit being opened at wiper MA1 when the switch reaches normal.

The first selector illustrated does not include a feeding bridge and it is assumed that this will be connected in a subsequent circuit. The holding of the connection will therefore depend on the presence of earth on wiper *p* applied in the said subsequent circuit and there will be a number of switching relays and the caller's cut-off relay all connected in parallel to wire *p*. There is a danger in such a case that when the holding earth is disconnected at the termination of a conversation, the switching relays, due to their parallel connections, will be somewhat tardy in releasing and should a selector test in to one of the circuits at that moment the resistance may be low enough to permit of operation of the test relay in the testing selector and so bring about a false connection. To guard against this the switching relays are furnished with two windings, one of which is of as high resistance as possible consistent with satisfactory operation while the other, which is connected in series with the first in the holding circuit, is of higher resistance so that under holding conditions a very high resistance is connected in each selector, too high for the series operation of a test relay even when as many serially-connected circuits as are likely to be connected up in an exchange have their switching relays connected in parallel.

The high resistance switching relays hold on a small current; consequently it is necessary to guard against the possibility of their being held due to reverse current leakage through the rectifier which is usually connected between wire *p* and the subscriber's meter. In practice there may be sufficient leakage of current via this rectifier to hold one switching relay but insufficient to hold two such relays in parallel. By connecting the rectifier to wire *m* which is connected to wire *p* on the wiper side of contact *h1* of the first selector instead of on the line finder side improper holding of the switching relays may be avoided.

The succeeding selector may be one in which outlets are divided into two main groups, the required group being determined by the transmission or non-transmission of a signal from the first selector. The signal consists in the application of earth to the positive wire when the connection is switched through whereby a relay connected to this wire in the succeeding selector is prevented from operating. The grouping in the succeeding selector may be arranged so that one group is indicated by an even-valued digit received at the first selector and the other group is indicated by an odd-valued digit received at the first selector. When relay TA is operated contact *ta3* connects earth to wipers MB2 and MA2. The alternate contacts in the banks of these two wipers are commoned and connected over contact *k3* to the positive wire. If the signal is to be transmitted in respect of even-valued digits, the connection will be made to the even-numbered contacts and the circuit will include wiper MB2 at normal and wiper MA2 on an even-numbered contact for a single digit selection or wiper MB2 on an even-numbered contact for a two-digit selection by the first selector.

If search for a free outlet in a marked group by the selector is unsuccessful, the wipers are brought to rset on the last contacts in the arc in which search has been made over which relay T operates in series with the resistances shunting relays LC and TA independently of the marking wipers of the marking switch, relay LC having been connected up at contact *pa4* consequent on the prior operation of relay PA. Relay LC and both windings I and II of relay TA are energised and the latter relay fails to operate because of the differential action of its windings. The operation of relay LC disconnects dialling tone at contact *lc1* and substitutes busy tone over contact *s1* and wire BT and at contact *lc2* closes the circuit for an overflow meter, the meter operated being selected by the marking switches to correspond with the selected group.

When the caller clears on receipt of busy tone, relay A is released and the control circuit is released in the manner before referred to, relay LC being released at contacts *bb1* or *bb2* as the case may be. Relay H not having been operated, the selector homes. When the connection is cleared after a conversation, relay H is released by disconnection of earth from wire *p* in known manner and at contact *h5* closes the homing circuit for the selector magnet over contacts *k6* and N1. When the selector wipers reach their normal position, contact N1 opens to stop the switch and contact N2 closes to complete the test-in circuit.

If, after taking the selector into use the caller fails to dial within a pre-determined time, or if the selector is taken into use due to a fault on the line, the control circuit is released but the selector is held. When the circuit is first seized relay C is operated and at contact *c3* connects wiper MA6 to the left-hand winding of relay S. The normal contact in the bank of wiper MA6 is earthed at intervals by what is known as an S pulse. When this occurs relay S operates and locks over its right-hand winding, contact *s2*, wiper MA4 and contact *b1*. Contact *s3* connects winding III of relay TA over wiper MA7 at normal to the Z pulse wire. If at the end of the pre-determined time, that is the time between successive applications of the S and Z pulses, no impulses have been received, so that switch MA has not been stepped, relay TA will be operated by the Z pulse. Contact *ta4* will extend earth over contact *b1*, wiper MA4 and contact *k5* to relay WS and that relay will operate, switch over the wiper connections and at contact *ws6* prepare an alarm circuit. Contact *ta2* operates relay H. The control circuit is now disconnected from the selector by the release of relay K and restored to normal consequent on the operation of relay H and release of relay A and the incoming loop is connected to battery over the left-hand winding of relay WS and contact *h7* and the normal contact in the bank of wiper −2 and to earth over the corresponding earthed contact in the bank of wiper +2. The selector, not having been moved off-normal, does not close the normal holding circuit for relay WS over contact N1 and relay WS remains operated dependent on the continuance of the loop circuit or of an earth on the + wire. Earth connected to the normal contact in the bank of wiper P2 is extended over that wiper to hold relay H and to mark the selector engaged and is extended over contacts *h1*, N2, *h6* and *ws6* to the alarm circuit. When the loop is broken by the caller replacing his receiver or by the removal of the fault, relay WS releases, its release being delayed slightly by the short-circuit across its right-hand winding over contact *h7*, and at contact *ws6* opens the alarm circuit, disconnecting the battery therein from wire *p*, at contact *ws4* releases relay H and at contacts *ws2* and *ws3* disconnects itself from the loop so that the selector circuit reverts to normal.

Relay S is also operated if a caller dials a "dead" number. For this purpose terminal *s* is connected to contacts in the bank of wiper MA4 or MB5 or MB6 corresponding to "dead" numbers, wipers MB5 and MB6 being connected to relevant contacts in the bank of wiper MA4 corresponding to first digits of "dead" numbers. If such a number is dialled, relay S will be operated and, consequent on the positioning of the selector wipers on the last contacts in their arcs, relay LC will be operated and NU tone will be reverted over wire NU, contacts *s1*, *lc1* and *b2* and the windings of relay A. Relay TA will not be operated in this instance for the reason before given.

I claim:

1. In an automatic telephone system, a single motion selector switch having an incoming line and wipers, said selector switch including a relay for connecting said lines to said wipers, control equipment associated with said switch, means in said equipment responsive to the receipt of impulses for selectively controlling the operation of said switch, additional relay means in said equipment for operating said relay if impulses are not received within a certain time after said switch is taken into use, means responsive to the operation of said relay for releasing said equipment and busying said selector switch, and means including said lines for holding said relay operated independent of said equipment.

2. In an automatic telephone system, an alarm circuit, a single motion selector switch having an incoming line and wipers, said switch including a relay for connecting said line to said wipers and a second relay for causing said line to be connected to certain ones of said wipers, control equipment associated with said switch, means in said equipment responsive to the receipt of impulses over said line for selectively controlling the operation of said switch, a third relay in said equipment operated if impulses are not received by a certain time after said switch is taken into use for operating said first relay and said second relay; and means responsive to the operation of said relays for busying said switch, releasing said control equipment, and for completing said alarm circuit.

3. In an automatic telephone system, a single motion selector switch, a line connecting with said switch, control equipment associated with said switch, means in said equipment responsive to the receipt of impulses received over said line for selectively controlling said switch, said switch including a relay for connecting said line to said wipers and a second relay for causing said lines to be connected to certain ones of said wipers, a third relay in said equipment operated if impulses are not received by a certain time after said switch is taken into use for operating said relays, means responsive to the operation of said relays for busying said switch and releasing said control equipment, said second relay connecting itself to said line through contacts on one of said wipers, and contacts on said first relay to thereby hold itself operated independent of said control equipment but dependent upon the condition of said line.

4. A telephone system as claimed in claim 3 in which said first relay operated by said third relay is held operated through one of said contacts, one of said wipers, and contacts on said second relay independent of said control equipment but dependent upon the condition of said line.

5. In an automatic telephone system, a single motion selector switch having wipers and banks of contacts accessible thereto, control equipment associated with said switch, a line connecting with said switch, said switch including a first relay for connecting said line to said wipers, a circuit for operating said first relay, means in said equipment responsive to the receipt of impulses received over said line for selectively controlling the operation of said switch, a second means in said equipment operated after the receipt of impulses for completing said circuit, a second relay for operating said second means if impulses are not received by a certain time after said switch is taken into use to thereby complete said circuit for operating said first relay, and means responsive to the operation of said first relay for releasing said control equipment and busying said switch.

6. In a telephone system, a selector switch having an incoming line over which the switch is seized and a plurality of sets of wipers each having a series of contacts accessible thereto, common control equipment including a line relay operated over said line when the switch is seized to select a set of wipers to be used to extend a connection through the switch and to operate the switch to seize a particular set of contacts accessible to the selected set of wipers, and a switch through relay for switching the line through to the selected set of wipers, additional relay means in said equipment operated after a predetermined time upon failure to operate the switch after seizure, said last means causing premature operation of said switch through and wiper switching relays to thereby release said control equipment and prevent further seizure of the switch.

7. A selector switch as claimed in claim 6 in which said line and switch through relays are held operated after such premature operation under control of a circuit including said line and certain of the contacts accessible to said wipers.

DOUGLAS PERCY LONG.

REFERENCES CITED

The following references are of record in the file of this patent:

UNITED STATES PATENTS

| Number | Name | Date |
|---|---|---|
| 1,200,841 | Ide | Oct. 10, 1916 |
| 1,225,291 | Ward | May 8, 1917 |
| 1,738,564 | Christian | Dec. 10, 1929 |
| 1,871,300 | Burgener | Aug. 9, 1932 |
| 1,914,384 | Richardson | June 20, 1933 |
| 1,941,085 | Hague | Dec. 26, 1933 |
| 1,956,371 | Christian | Apr. 24, 1934 |
| 1,970,337 | Pope | Aug. 14, 1934 |
| 2,137,423 | Taylor | Nov. 22, 1938 |
| 2,262,446 | Beale | Nov. 11, 1941 |
| 2,291,496 | Newstedt | July 28, 1942 |
| 2,416,086 | Christian | Feb. 18, 1947 |
| 2,416,109 | Long | Feb. 18, 1947 |